(12) United States Patent
Sieling et al.

(10) Patent No.: US 6,361,851 B1
(45) Date of Patent: Mar. 26, 2002

(54) COMPOSITE ROOFING SHINGLE

(75) Inventors: Frederick W. Sieling, Bound Brook; William R. Carroll, Sussex, both of NJ (US)

(73) Assignee: Building Materials Investment Corporation, Wilmington, DE (US)

( * ) Notice: Subject to any disclaimer, the term of this patent is extended or adjusted under 35 U.S.C. 154(b) by 0 days.

(21) Appl. No.: 09/406,492

(22) Filed: Sep. 27, 1999

Related U.S. Application Data

(60) Provisional application No. 60/107,372, filed on Nov. 6, 1998.

(51) Int. Cl.[7] .................................................. B32B 7/04
(52) U.S. Cl. ....................... 428/144; 428/141; 428/142; 428/143; 428/194; 52/557; 52/558; 52/559; D25/139
(58) Field of Search ................................ 428/141, 142, 428/143, 144, 192, 194, 195; 52/518, 557, 558, 559; D25/139

(56) References Cited

U.S. PATENT DOCUMENTS

D350,615 S  *  9/1994  Klein et al. ................ D25/139
D400,981 S  * 10/1998  Bondoc et al. ............ D25/139
6,014,847 A  *  1/2000  Phillips ...................... 52/311.1

* cited by examiner

*Primary Examiner*—Blaine Copenheaver
*Assistant Examiner*—Christopher Paulraj
(74) *Attorney, Agent, or Firm*—Marilyn J. Maue; William J. Davis; Walter Katz

(57) ABSTRACT

A composite roofing shingle coated with weather resistant granules on its exposed surface which comprises (a) a top member having an upper undivided headlap section and a lower butt section comprising spaced tabs depending from said headlap and (b) a bottom backer member attached to the under surface and coterminal with the length of said headlap section, said backer member being exposable in the spaces between said tabs, said tabs carrying a horizontal band area of a given hue which contrasts with that of the remaining portion of the tab and which is painted or printed across the bottom margin of the tab to provide a band having a relatively smooth surface, said backer member having a surface texture distinguishable from the texture of the color band and having weather resistant granules embedded on its exposed surface; which granules are of a contrasting color with respect to the unpainted portions of the tabs.

18 Claims, 3 Drawing Sheets

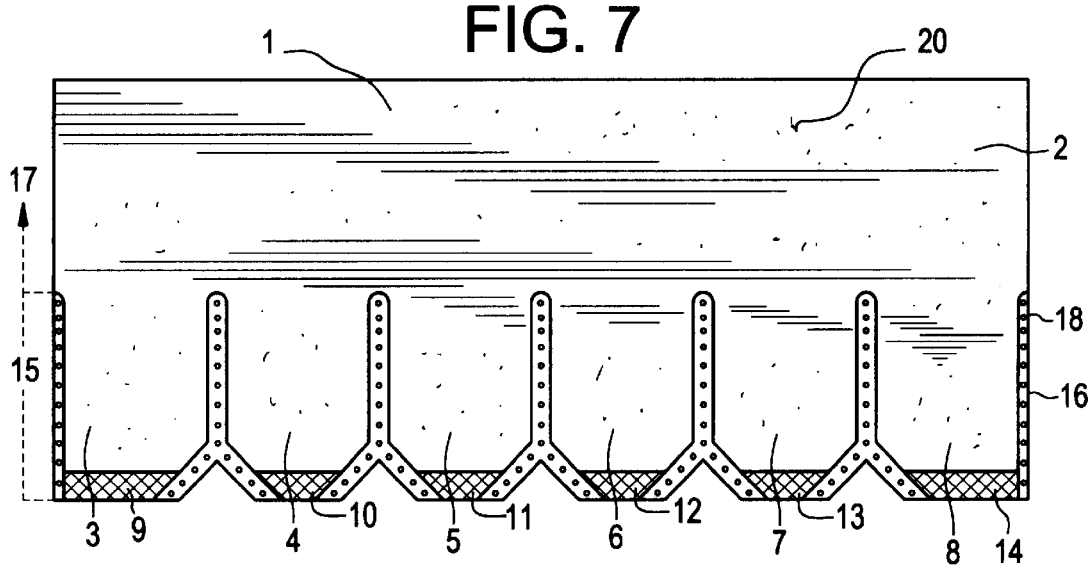
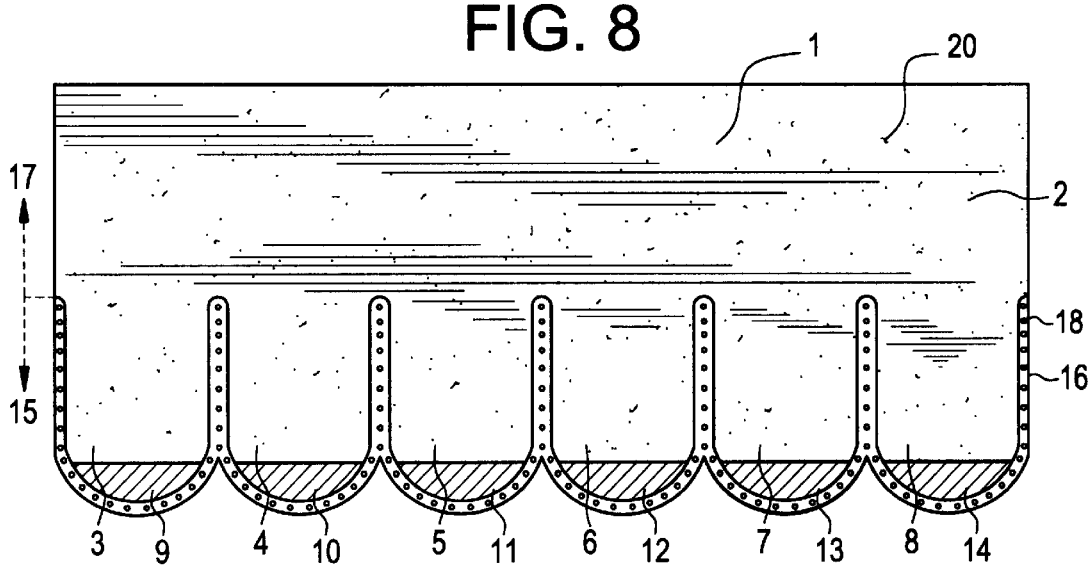
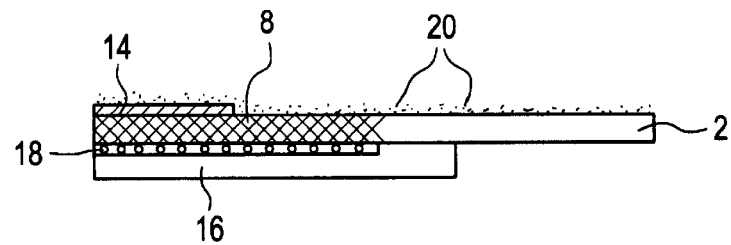
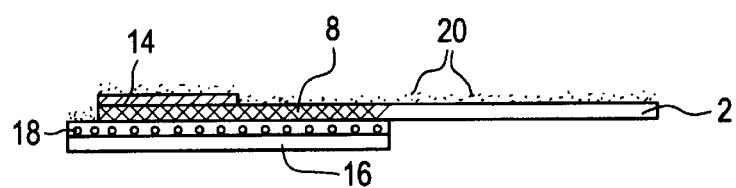

COMPOSITE ROOFING SHINGLE

CROSS-REFERENCE TO RELATED PATENT APPLICATION

This application is a continuation-in-part of Provisional U.S. Patent Application, Ser. No. 60/107,372, filed Nov. 6, 1998 in the names of Frederick W. Sieling and William R. Carroll.

BACKGROUND OF THE INVENTION

Roofing shingles are often divided into two main groups: strip shingles and composite or laminated shingles. Although both are surface coated with weather resistant granules, strip shingles having a single thickness generally do not provide the durability and weatherability as those composed of two or more layers. Also the single layered strip shingle has a flat appearance which is not as aesthetically pleasing as double or triple layered laminated shingles. Research directed to tabbed laminates has been concerned with simulating the appearance of wood shake or slate roof coverings without incurring their accompanying deficits such as high cost, difficulty of proper installation, breakage and load weight which often requires reinforcement of a roof understructure. Solutions have included color variations to impart a perception of shadows, which affect is generally achieved by deposition of granules having darker or lighter contrasting colors between tabs and restricted areas of a backer strip. These methods have provided only partial improvement in the perception of shadows resulting from shingle bulk and irregularly shaped tabs as perceived viewed in the more expensive counterparts.

Accordingly, it is an object of this invention to improve the desired simulation in an economical and commercially feasible manner.

Another object is to more closely approach the appearance of wood shake or slate roof coverings.

Still another object is to provide an aesthetically improved roofing shingle achieved by a simplified manufacturing process.

These and other objects and advantages will become apparent from the following description and disclosure.

SUMMARY OF THE INVENTION

In accordance with the present invention there is provided a laminated roofing shingle having tabs and backer strip of distinguishable colors or color intensities and distinguishable textures in exposed areas normally associated with shadowing.

BRIEF DESCRIPTION OF THE DRAWINGS

For a more complete understanding of the invention and the advantages thereof, reference is now made to the following description taken in conjunction with the accompanying drawings, in which FIGS. 1 through 8 inclusive are presented in top plan view.

FIG. 7 shows another embodiment wherein all tabs are uniformly shaped and have crimped bottom corners and wherein the bottom margin of the backer is coextensive with the bottom boundaries of the tabs and is of a hue or color substantially the same or different from that of the color bands of the tabs.

FIG. 8 illustrates still another embodiment wherein all tabs are uniformly shaped and have rounded bottom corners and wherein the bottom margin of the backer member extends below the bottom edge of the tabs.

FIG. 9 is an elevated side view of FIGS. 1, 4 and 7 wherein the bottom margin of the backer member is coextensive with the bottom edges of the tabs and FIG. 10 is an elevated side view of FIG. 8 wherein the backer member extends below the bottom edges of the tabs.

DETAILED DESCRIPTION OF THE INVENTION

Figure 1:
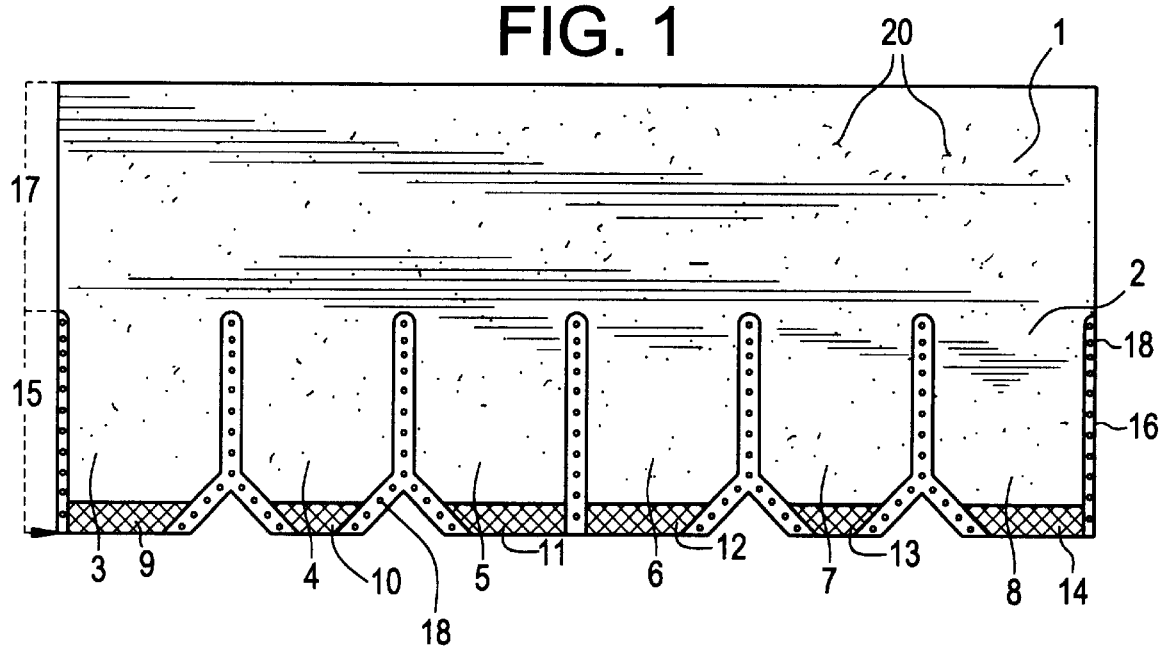
FIG. 1 is a laminated shingle incorporating one embodiment of the present invention wherein the tabs are of irregular and alternating shape and the backer bottom edge is flush with that of the tabs.

The laminated or composite shingles of this invention are generally produced as rectangular units of 2 to 8 spaced tabs which depend from an undivided headlap section of a top sheet or top member, the later being attached on its under surface to a backer member which is exposable in the spaces between, i.e. at the sides of the tabs and optionally below the tab bottom margins. The spacing between the tabs can be between about 1/16th and about 1 inch commensurate with the size of the tabs and the height and size of the roofing area. Most often tab spacing between about 1 and about 5% the breadth of the tab is recommended. The tabs themselves can be of any conventional regular or irregular size and/or shape and may be separated by regular or irregular spacing. However, the preferred shingle contains a top member having a butt portion containing 4 to 6 uniformly spaced tabs wherein at least two tabs are of identical shape and wherein the butt portion is indented from the leading and trailing edges of the headlap section by about ½ the area of the spacing between the tabs.

In the present shingle, the bottom boundary of the backer member may also be coterminal with the bottom edges of the tabs or the backer can be positioned to extend below the bottom edges of the tabs by a margin preferably equal to the breadth of the tab spacing. Although the backer may be an undivided rectangular strip, for a particularly aesthetically pleasing appearance, the bottom margin of the backer member duplicates the lower contour of tabs having non-right angled bottom corners, thus the backer may be notched, cerenate or dentate at corresponding areas of tabs having like shape. At least the exposable area, desirably the entire area, of the backer member is surfaced with weather resistant or colored granules to present a perceivably roughened surface.

The lower end portions of the tabs carry a color band which is painted or imprinted horizontally across the tab bottom margin to provide a contrasting surface finish or texture. The width of the color band can vary from about ⅛th to about ¼th the height of the tab, and is preferably a band of color, preferably having an unvaried width of from about 0.5 to about 1 inch; although the width can be varied slightly to provide a perception of irregularity. The basic color of the color band can be the same as that of the exposed surface of the backer or it can be a lighter or darker shade or hue; or the color of the band can be distinctly different to simulate the perception of bulk, highlight, shadow or any other aesthetic affect achievable by contrast with the exposed areas of the backer. Additionally, one or more of the bands themselves can be varied in hue for a certain desired affect. The dye of the color selected for coloring matter in both the backer granules and that of the paint or print of the color band should be resistant to UV light exposure, temperature fluctuations and humidity and the color band should present a smooth and moisture impervious surface; although weather resistant granules are also applied over the entire exposable surface of the top member.

The texture contrast between the backer and the color band of the tabs can be accentuated by varying the consistency of the weather resistant top coating, e.g. the density and/or size of granule deposition on either of these members. Since the painted or imprinted treated area of the tabs itself presents a relatively smoother surface than other untreated areas, it differs in roughness or texture from the surface of the backer after granule deposition.

The preferred embodiments and advantages of the present invention can also be understood by reference to FIGS. 1 through 10 of the drawings, like numerals being used for like and corresponding parts.

In FIG. 1, top member 2 of laminated shingle 1, having undivided headlap section 17 and butt section 15 depending from 17 contains regularly spaced tabs 3–8 of irregular and alternating shape, said tabs having corners which are both crimped or having one crimped and one right angled corner. The lower boundaries of tabs 3–8 are each painted with color bands 9–14 of uniform width and hue. Backer member 16 which is laminated to the under surface of headlap 15 in top member 2, is undivided at the area corresponding to the spaces between the tabs but is crimped at its lower boundary to correspond with the crimped tab edges and extends from the crimped side corners of the tabs by a margin about equal to the spacing between the tabs. The bottom boundary of backer member 16 is coterminal with that of tabs 3–8; however, it is to be understood that the backer member can be extended below the tabs, if desired. Backer 16 is surfaced with weather resistant granules 18 of a hue distinguishable or indistinguishable from that of color bands 9–14 but distinguishable from the hue or color of the untreated portion of the tabs above color bands 9–14. As shown, the surface granules on backer 16 are of a visibly coarser grain than the granules 20 on the surface of top member 2 to emphasize texture differences; although such emphasis is optional.

Figure 2:
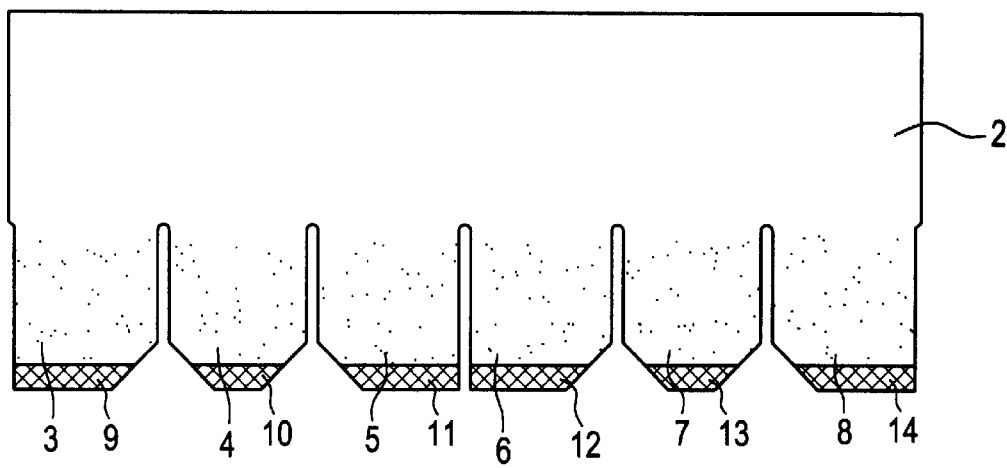
FIG. 2 is a view of the top member of the shingle of FIG. 1 before lamination to the backer member shown in FIG. 3.
Figure 3:
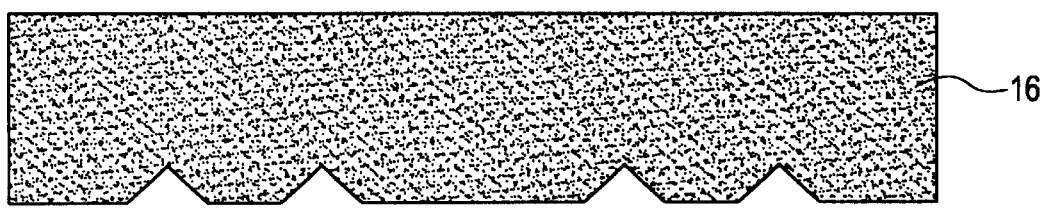

FIG. 2 shows granule coated detached top member 2 with tabs 3–8 and color bands 9–14 on tabs 3–8 and FIG. 3 shows detached backer member 16 of FIG. 1. In the above drawings, color bands 9–14 can be lighter, darker or of the same color as the exposed surface of the backer member 16.

Figure 4:
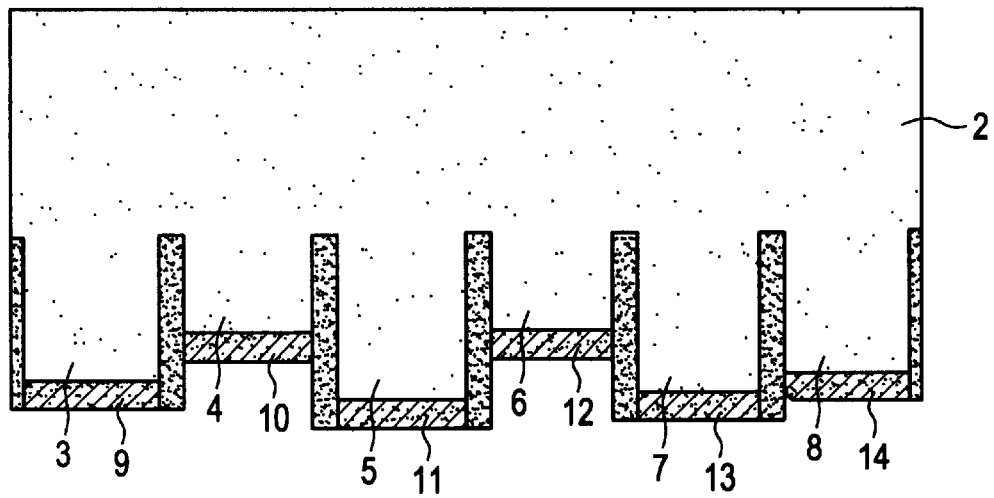
FIG. 4 is a view of a second embodiment of the shingle wherein the tabs are of irregular length and are rectangular in shape.
Figure 5:
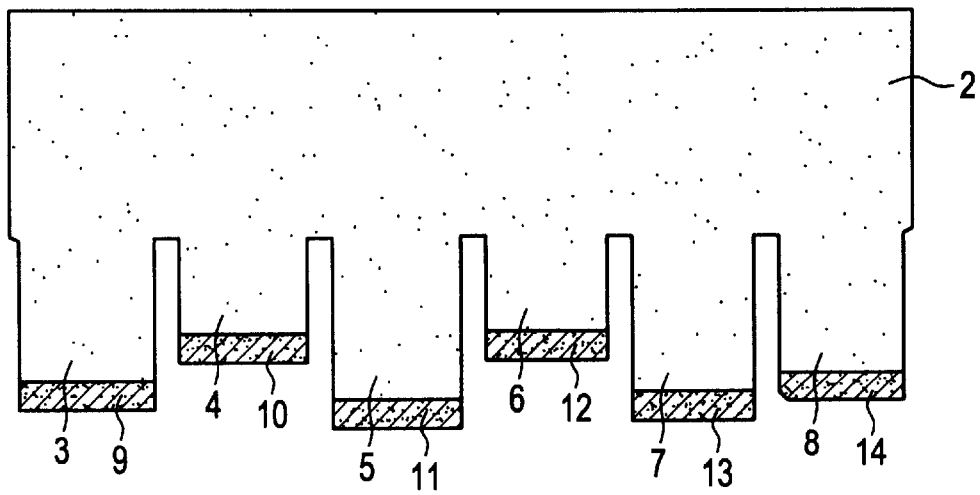
FIG. 5 represents the top member of the FIG. 4 shingle before lamination to backer member as illustrated in FIG. 6 which backer is coextensive with the bottom boundaries of the tabs.
Figure 6:
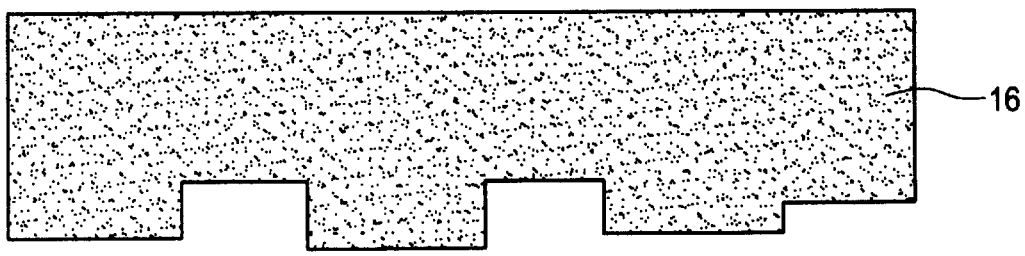

FIG. 4 illustrates another embodiment of the composite shingle wherein color banded tabs 3–8 of top member 2 are of different lengths as indicated more specifically in detached top member 2 shown by FIG. 5. FIG. 6 illustrates detached backer member 16 before attachment to top member 2 in the embodiment of FIG. 4.

Another embodiment is illustrated in FIG. 7 wherein all of the bottom corners of tabs 3–8 depending from headlap section 17 of top member 2 are uniformly crimped. Conversely, in FIG. 8, all of tabs 3–8 have crenated ends and similarly crenated backer 16 extends below the bottom edges of tabs 3–8, as well as at the side edges of the tabs, to form a uniform margin of backer color and width around the free edges of each tab.

The side view of composite shingles shown in FIGS. 1 through 7 is described by FIG. 9 wherein weather resistant granules 20 of top member 2 covering tab 8 and color band 14 and coarser granules 18 of backer member 16 are shown. FIG. 10 illustrates the side view of the shingle of FIG. 8 with crenated tabs 3–8 and crenated color bands 9–14 of top member 2 joined to similarly crenated backer member 16. Although the granules on the backer in FIGS. 2–9 are shown to be coarser than those of top member 2, it is to be understood the size and/or density of granules on these members can be reversed to emphasize a difference in coarseness and texture between the surfaces of the top member and the backer member. Another means of achieving texture emphasis can be obtained by varying the density of granule deposits on members 2 and 16. In any case a difference in texture between the painted band area of the tabs and the backer member is always discernable since the painted area presents a smoother surface than any unpainted area.

From the above disclosure it will become apparent that many variations and modifications of the above figures can be made without departing from the scope of this invention. For example, the hue in each color band as well as the bands themselves can be varied. Similarly the hue of the backer can be varied provided that the difference in hue between the painted areas and the unpainted tab area is maintained. These and other modifications will be become apparent from the above disclosure.

What is claimed is:

1. In a composite roofing shingle unit having a weather resistant granular coating on weather exposable areas of its surface and comprising (a) a top member containing an upper undivided headlap section and spaced tabs in a lower butt section depending from said headlap and (b) a backer member attached to the under surface of said headlap and exposable in the spaces between said tabs, the improvement which comprises: tabs having a substantially smooth band of color painted horizontally across the tab bottom margin, said band of a color being distinguishable from the color of the remaining tab portion and having a width between about $\frac{1}{8}^{th}$ and about $\frac{1}{4}^{th}$ the height of said tab and an unpainted backer member of a distinguishable texture so as to provide a visually distinguishable difference texture between the color band of the tabs and the exposable areas of said backer member.

2. The composite roofing shingle of claim 1 wherein the difference in texture between the exposed areas of said backer and the color bands of said tabs is emphasized by a difference in the granule deposits between the top and backer members.

3. The composite roofing shingle of claim 2 wherein said difference in texture is emphasized by a difference in the size and/or shape of said granules.

4. The composite roofing shingle of claim 2 wherein said difference in texture is emphasized by a difference in the density of the granule deposits.

5. The composite roofing shingle of claim 1 wherein the difference in texture between said color band and the exposable areas of said backer is achieved by the difference in granule covered surfaces between the smooth painted surface of said color bands and the coarser unpainted surface of the backer member.

6. The composite roofing shingle of claim 1 wherein the hue of the backer is of the same color as the color band of said tabs but of a lighter or darker hue than the remaining unpainted portion of said tabs.

7. The composite roofing shingle of claim 6 wherein the hue of the backer is of a color different from the color of said color bands.

8. The roofing shingle of claim 1 wherein said tabs are of uniform shape.

9. The roofing shingle of claim 1 wherein said tabs are of alternatingly different shape.

10. The roofing shingle of one of claims 8 or 9 wherein said tabs are uniformly spaced one from the other.

11. The roofing shingle of claim 10 wherein the spacing between the tabs is between about 1 and about 5% the breadth of the tab.

12. The roofing shingle of claim 1 wherein the exposed surface of said backer forms a uniform margin at the sides and corners of each tab.

13. The roofing shingle of claim 12 wherein the exposed surface of said backer forms a uniform margin around the free edges of all tabs.

14. The roofing shingle of claim 1 wherein a color band of equal width and color is painted across the bottom horizontal boundary of each tab.

15. The roofing shingle of claim 1 wherein at least two neighboring tabs have an outer crimped corner and a facing right angled corner.

16. The roofing shingle of claim 15 wherein said band of color is the same color of the backer member.

17. The roofing shingle of claim 15 wherein said band of color is in contrast with the color of the backer member.

18. The roofing shingle of claim 15 wherein the leading and trailing edges of the butt portion are inset from the headlap portion.

* * * * *